United States Patent
Keichel

[11] 3,903,758
[45] Sept. 9, 1975

[54] INDEX TABLE
[76] Inventor: Harold A. Keichel, 29679 Franklin Ave., Wickliffe, Ohio 44092
[22] Filed: May 7, 1973
[21] Appl. No.: 357,787

[52] U.S. Cl.................. 74/826; 74/813 L; 74/817
[51] Int. Cl.² ......................................... B23B 29/32
[58] Field of Search.......... 74/826, 813 L, 816, 817; 269/64, 67-70

[56] References Cited
UNITED STATES PATENTS

| | | | |
|---|---|---|---|
| 3,048,059 | 8/1962 | Cross | 74/813 L |
| 3,222,955 | 12/1965 | Ross et al. | 74/826 |
| 3,552,242 | 1/1971 | Morgan, Jr. et al. | 74/826 |

Primary Examiner—Granville Y. Custer, Jr.
Assistant Examiner—Neil Abrams

[57] ABSTRACT

There is disclosed index table construction having an index plate arranged to inter-engage with a base and raised by mechanism therein to a position above the base, rotated to a predetermined new position, and thereafter lowered into positive inter-engaged condition with such base, work pieces or tools carried by such plate being thus rotationally accurately translated to new positions.

3 Claims, 7 Drawing Figures

3,903,758

INDEX TABLE

OBJECTS OF THE INVENTION

It is a principal object of this invention to provide an index table construction in which a plate incorporated therein, upon which a tool or work piece is mounted, or may be mounted, when the same is used as a turret for example, or a simple index table, wherein the table is able to be raised, rotated and lowered into a new position in response to actuating devices and construction thereof, with the table in all positions maintained in precisely the same rotative relation irrespective of the number of times rotated or the increment by which the same is rotated, thus providing extremely accurate positioning for repeated use of the tool or operation on the work piece carried by the table and plate thereof.

It is a further object of the invention to provide structure, including a plate rotatably mounted with respect to a base, so that by suitable actuating means the table may initially be raised, rotated a predetermined distance and lowered into a predetermined relationship with integral means on the plate and base which interengage to assure repeated identical positioning of the plate with respect thereto.

It is a further object of this invention to provide a structure in which a combination action of raising and rotating is effected by the mechanism provided therein, reversing action of certain of the mechanism being effected at a predetermined point to lower the plate into inter-engaged position with the base, and maintain the plate in such condition as will accurately be able to be repeated from time to time in various increments or combinations thereof, for purposes of operating on a work piece or using the index table as a turret.

Another object of the invention is to provide novel mechanism within the base which, by provision of certain screw means, will raise the table plate out of engagement with positioning means carried on the plate and base, rotate the same to a point where actuating means are operated to effect a reverse action of the screw means, and lower the plate after locating means carried within the base are actuated to initially engage with the plate to prevent further rotation. Subsequent continued action of the actuating means causes the plate to be lowered into the position where the positioning means thereon and on the base are interengaged for the purpose and in the manner hereinbefore set forth for accurately positioning said plate in repeated manner and in varying increments as may be determined by the use for which the index table is intended.

Other and further objects of the invention will be understood from a consideration of the specification appended hereto, and disclosed in the drawings wherein.

DESCRIPTION OF THE INVENTION

Figure 1:
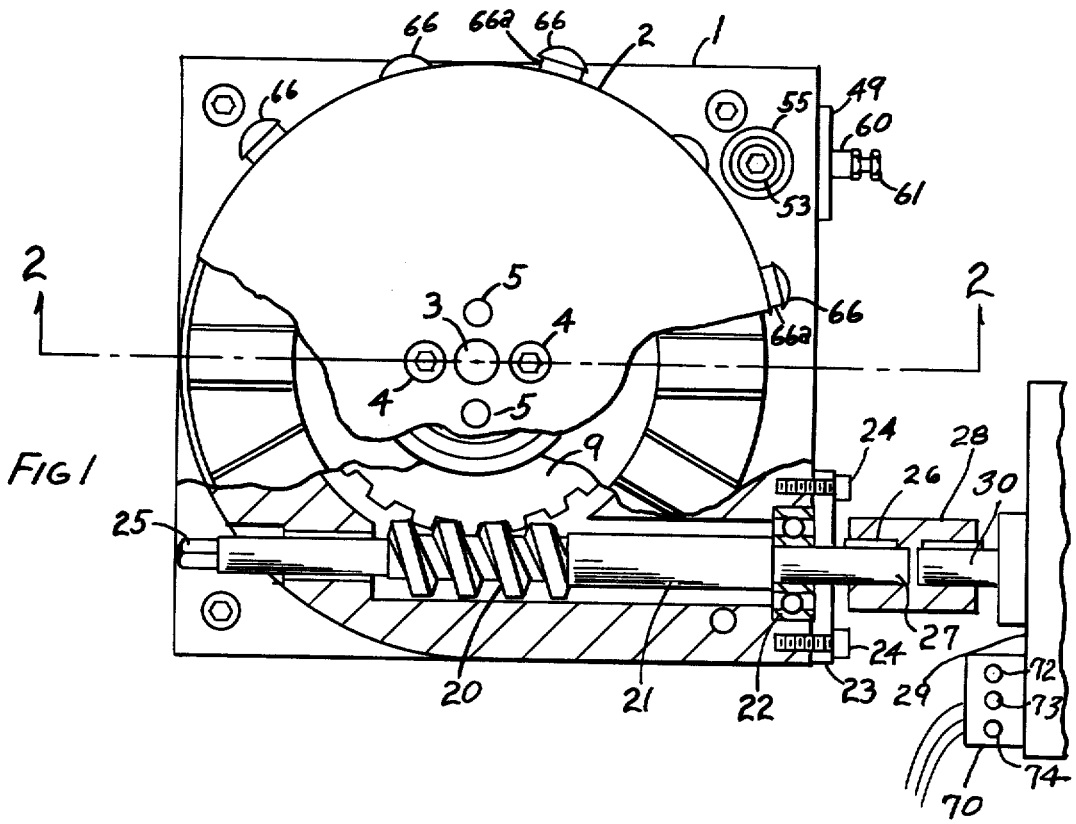
FIG. 1 is a top plan view, partly fragmentary, to illustrate the relationship of certain of the parts of the mechanism.
Figure 2:
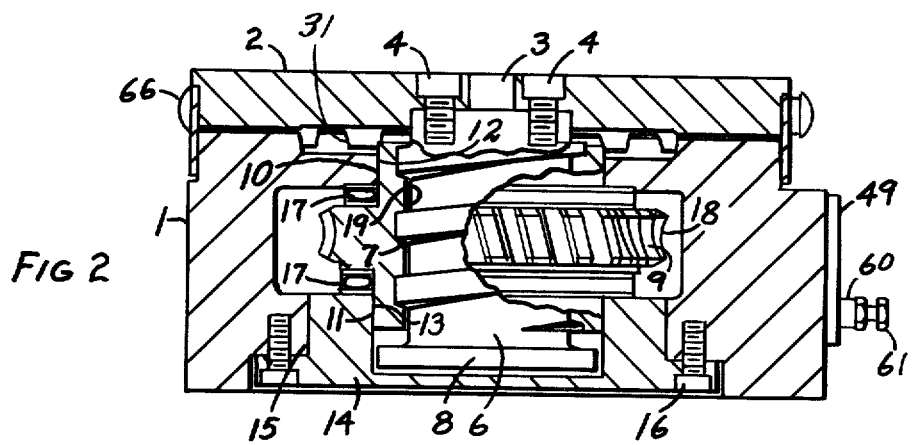
FIG. 2 is a side view, looking toward one side of the mechanism of FIG. 1 to further illustrate the relationship of certain of the parts thereof.
Figure 3:
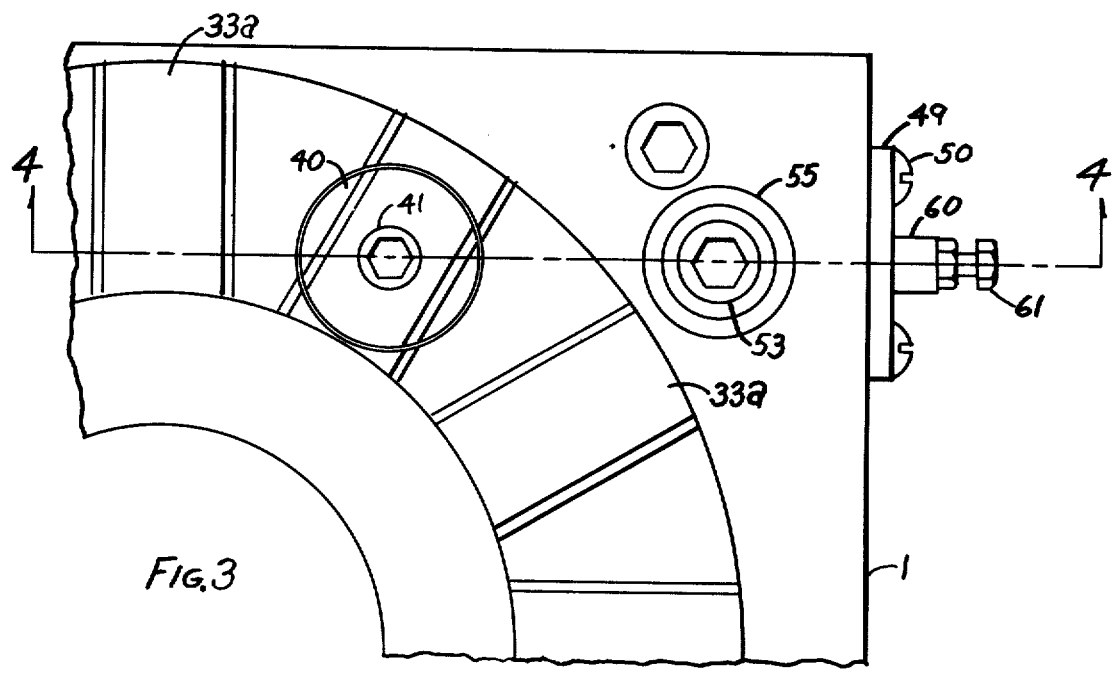
FIG. 3 is a fragmentary view to illustrate certain positioning means and locating means.

Referring to FIG. 1, the index table of this invention is shown as comprising a generally rectangular base 1 of substantial thickness as suggested particularly in FIG. 2, having the index table plate 2 mounted so as to be above the base generally speaking, this table being of round configuration, movable about the central axis 3 in a manner to be more particularly described.

The plate 2 is connected by means of suitable socket head screws such as 4 and maintained accurately by means of dowels such as 5 in connection with a central axial screw means or central column generally designated 6, being of special form and having the double Acme thread formation 7 thereon, with a shoulder 8 at the lower end.

This axial screw means or column 6 is supported in a rotatable captive nut and worm gear member generally denoted 9, which member 9 includes the upper and lower cylindrical surfaces 10 and 11 respectively, located in a bore 12 at the upper end, and a bore 13 at the lower end, which latter bore is formed in a base cap 14, maintained in position in a suitable opening 15 in the base 1 by means of cap screws such as 16.

The nut and gear member 9 is supported for rotation by the needle bearings 17, there being one of these above the worm gear portion 18 and one below the said portion of this nut and gear member.

It will be understood that the interior of the nut and gear member 9 is provided with a mating double Acme modified gear formation 19 whereby rotation of the member 9 will cause the screw means or central column 6 to be raised upon rotation of the nut and gear member 9 in one direction, and lowered upon rotation of the said member in the other direction.

As will be clear from a consideration of FIG. 1, rotation of said nut and gear member 9 may be effected by a drive worm 20 extending so as to inter-engage with the teeth or gear portion 18 of the member 9, and be mounted in the base 1 on a shaft 21, having bearing support 22 in a cap 23 connected to the base by cap screws 24.

The shaft 21 which includes the drive worm 20 therein, may be provided with a square formation 25 at one end, and a keyed connection 26 at the other end denoted 27, which in turn may be connected by a coupling 28 to a drive motor 29 and specifically the shaft 30 thereof, the drive motor 29 being illustrated fragmentarily.

Figure 6:
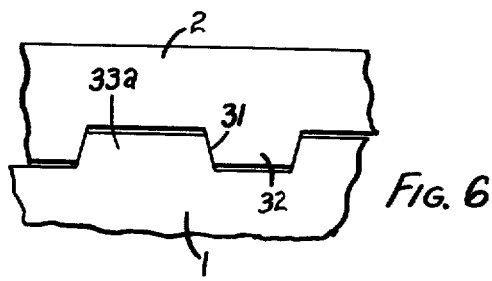
FIG. 6 is a fragmentary view, illustrating the positioning means of the base and plate in engaged condition.

Referring now to FIGS. 2 and 6 primarily at this stage, it will be noted that the plate 2 on its lower surface is provided with tooth formation 31, the tooth formation being formed by radial teeth 32 thereon, this structure being designed to interengage with a mating tooth formation 33 formed on the upper surface of the base 1, including teeth 33a.

It will be apparent that the mating formations will thus provide for an interlocking inter-engagement with positive positioning of the plate 2 when these teeth or tooth formations are in the condition of FIG. 6, for example.

Since it is the contemplation of this invention that the plate 2 shall be rotated to various positions and in increments of any preferred extent such as 12, for example which will provide 30° movement of rotation if each such increment were availed of, and obviously any lesser increments or greater increments could be formed in the combination as will be subsequently understood, within the range of formation of the teeth or inter-engaged positioning means shown in FIG. 6.

It might also be noted that the formation of such inter-engaged members may be of various configurations, such as spirally arranged or otherwise to provide the necessary positive positioning and interlocking arrangement desired and explained herein.

Figure 4:
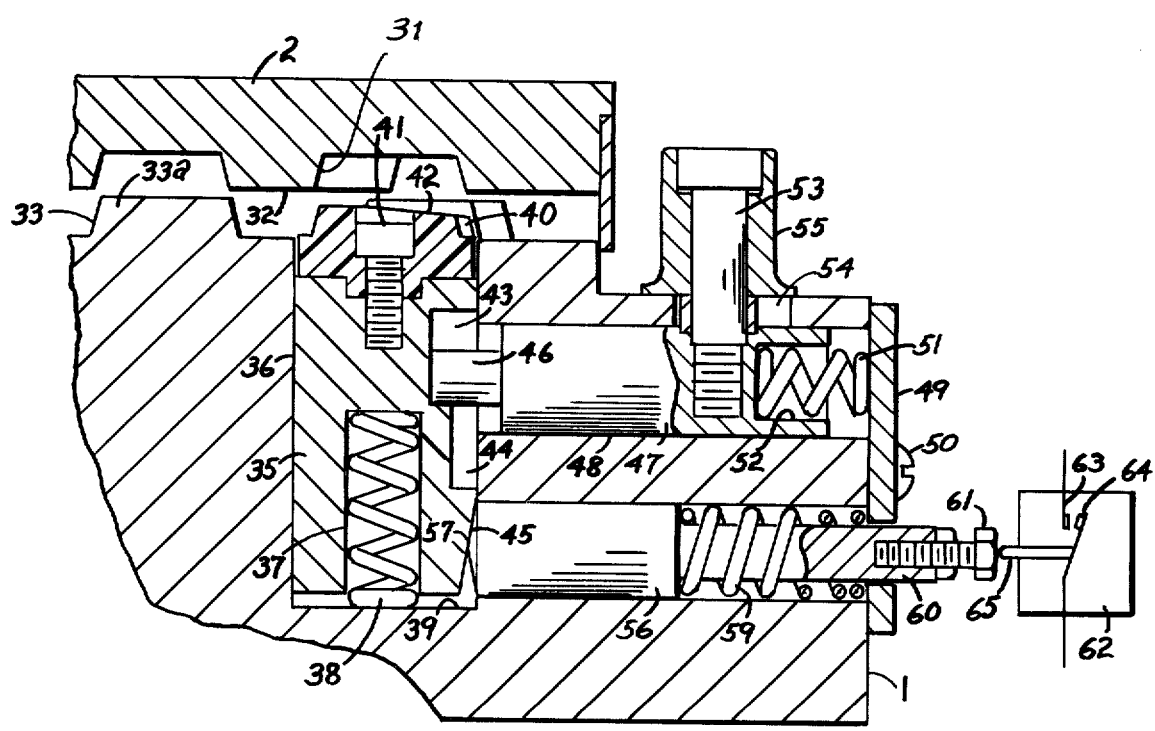
FIG. 4 is a fragmentary sectional view of one position of the locating means and initial position of limit switch operating means before actuation.
Figure 7:
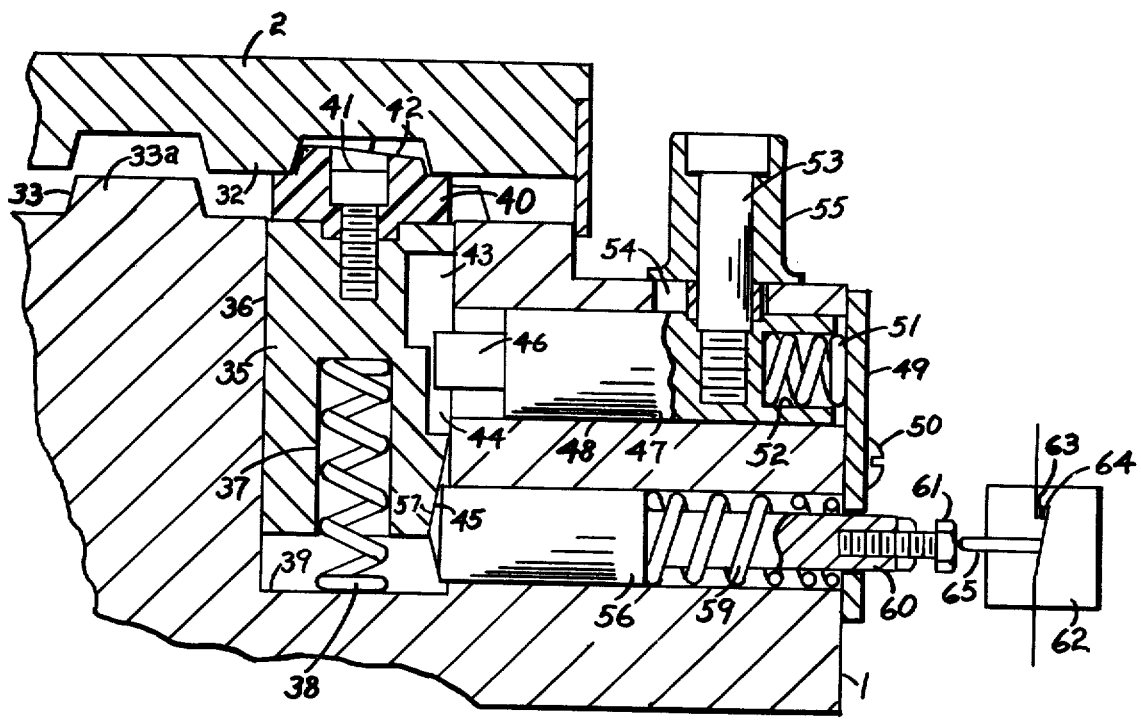
FIG. 7 is a view similar to FIG. 4, fragmentary and in section, illustrating a condition in which the locating means is in engagement with positioning means of the plate prior to lowering of the plate into fixed position as suggested in FIG. 2.

Turning now to a consideration of FIGS. 4 and 7, there is here disclosed the means for controlling the movement of the plate 2 in its rotational action, there being here shown a locater plunger 35 suitably supported in the base 1 in an opening 36 therein for vertical movement, a socket 37 being formed in the plunger 35 to receive a spring 38 which bears against the bottom 39 of the opening 36, being preferably cylindrical and the plunger 35 being generally cylindrical likewise.

The plunger 35 is equipped with a head 40 of suitable plastic or like material which will not damage the teeth with which it is to be engaged, as will be subsequently explained, this head 40 being maintained in position on the plunger 35 by a cap screw 41, and thus being removable; this head having the angle surface 42 thereon.

The plunger 35 is equipped with suitable slotted areas 43, 44 and an angled surface 45 at the lower end thereof, the slotted portions 43 and 44 being designed to receive, the slot 43 being initially referred to, the end 46 of a latch 47 which is reciprocable and mounted at right angles in a suitable opening 48 in the base 1, being retained by a cap 49 fastened by the screws 50 to said base, a spring 51 being shown in position in a suitable socket 52 in the end of the latch 47, the spring 51 bearing against the plate 49 so as to tend to maintain the said latch 47 in its leftward position and thus the end 46 thereon in the slot 43 of the plunger 35.

In order to move the latch 47 rightwardly as will be required, the latch arm is provided and consists of the screw 53 extending upwardly through a slot 54 in the base 1, said screw 53 having a roller 55 surrounding the same and arranged to transmit to the screw 53 the necessary movement against the spring 51.

Mounted below the latch 47, is a switch operator 56 being a cylindrical member having the bevel end 57 thereon at one end to engage with a bevel portion 45 on the locater plunger 35, being maintained in such contact by means of a spring 59 surrounding the end 60 of said switch operator 56, this end extending outwardly beyond the plate 49 and having the adjusting screw contact part 61 at the end thereof.

The foregoing mechanism may be generally designated as the actuating means when taken in conjunction with the limit switch suggested at 62, having the contacts 63 and 64 therein, controlled by the contact part 65 which engages the screw contact part 61 previously mentioned for purposes which will subsequently be explained.

Figure 5:
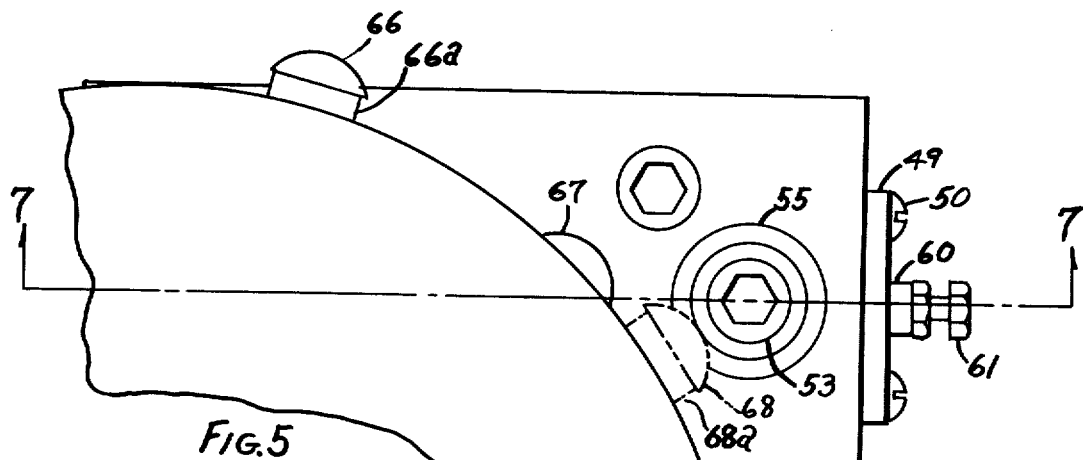
FIG. 5 is a fragmentary view, somewhat like FIG. 3, illustrating certain striker members in their position on the plate for actuation and non-actuation.

Turning now to a consideration of FIGS. 1 and 5, there are shown certain striker members 66 and 67 for example, as well as a striker member 68 in dotted lines, which striker members are arranged to be positioned in suitable openings formed in the periphery of the plate 2 and thus being removable therefrom or replaceable in other openings as may be desired, to provide the necessary rotational increments which may be selected for purposes of use of the device herein under consideration.

The functioning of the device as a whole may now be described, reference being made first of all to FIG. 1, and the control switch 70 denoted thereon as being arranged to control the operation of the motor 29, buttons such as 72, 73 and 74 being provided for operation of the motor 29.

Assuming that the motor 29 is actuated by rotation in one direction by button 72, the same will in turn rotate the drive worm 20, transmitting such rotation to the screw means 6 whereby the same is raised by means of the Acme threads of the respective parts so that the positioning means 32 and 33 are out of engagement by the initial phase of movement, thus actually of course raising the plate 2 sufficiently for that purpose.

Assuming therefore that the plate 2 has now been raised into the position shown in FIG. 4 for example, with the teeth 32 and 33 out of engagement, continued operation of the motor 29 will cause the table 2 to be rotated. Assuming that this rotation is in the clockwise direction, it in turn moves striker member 68 for example in the dotted line position shown, such striker member in turn effecting movement of the latch arm 47 by engagement with the roller 55 and permitting the member 68 to move and rotate said roller 55, this effecting rightward movement of the latch arm and specifically the latch 47 as viewed in FIG. 4, so that the end 46 thereof is moved out of the slot 43.

Such movement will permit the rotater plunger 35 to be released so that the head 42 thereof moves upwardly into a position where it abuts the underside of a tooth 32, further rotation of the plate 2 permits the head to rise into engagement between that tooth and the one next thereto as member 68 moves past roller 55 allowing end 46 to now enter slot 44 as suggested in FIG. 7.

At the same time that this action takes place, the switch operator 56 has moved leftwardly as permitted by the respective surfaces 57 and 58 on the operator 56 and locater plunger 35 respectively, and thus the limit switch 62 is permitted to operate so that the contacts 63 and 64 are engaged.

This action is designed to effect reverse rotation of the motor 29 as to the shaft 30 thereof, in turn effecting reverse rotation of the drive worm 20 and thus transmitting to the worm gear 9 similar reverse rotation. Since the plate 2 is maintained in the non-rotative condition by the engagement of the head 42 between teeth 32 of said plate, the only action which can now take place is a lowering action on the part of the screw means 6 to the condition shown in FIG. 2.

In lowering such plate 2, the head 42 is likewise caused to move downwardly against pressure of spring 38 so that again the latch 47 will move leftwardly to cause the end 46 to again engage with the slot 43 to retain the locater plunger 35 in the condition of FIG. 4.

At the same time this takes place, the switch operator 56 is moved rightwardly against the pressure of the spring 59, causing the contact 63 and 64 to be broken, thus terminating the action of the motor 29.

Since the positioning means have now been brought into fully engaged condition, that is the teeth 32 and 33a are inter-engaged, the plate is now firmly and accurately repositioned rotatively with respect to its former condition.

Positioning of the striker members such as 66, 67 or 68 including spacers such as 66a and 68a to cause the heads to protrude sufficiently to engage roller 55, may be effected at various increments around the periphery of the plate 2 to provide various increments of movement of said plate in accordance with desired positions of movement of a work piece, for example, carried by the plate or a tool carried by said plate if it is acting as a turret.

It may be appropriately noted that the design of the double Acme teeth of the central screw means of the central column 6 and mating teeth of the thread of the captive nut and worm gear member 9 is such as to be non-locking and the flange 8 positioned to control movement of the screw means, or central column 6, this flange 8 acting to engage with the captive nut and worm gear member 9 to effect the rotation thereof, and thus the rotation of the plate 2 as heretofore described.

In place of the axial screw 6 and nut and worm gear member 9, other means such as rack and pinion or chain and gears as well as cam and follower construction might be availed of to transmit a comparable rotating and raising and lowering action.

I claim:

1. In index table construction of the class described, in combination, a base, an index table plate supported thereby and rotatable with respect thereto, means on the plate and base to accurately position said plate in fixed relation with said base, and means to raise, rotate and lower said plate with respect to said base, including means to positively position the raised plate with respect to said base, and including actuating means to initiate and terminate said movements said means comprising a rotatable captive nut in the base, having a central thread portion therein, axial screw means extending through the nut, rigidly connected to the plate and directly operable upon rotation of the nut to move the plate upwardly, rotate the same and lower said plate in predetermined position as determined by the positioning means in response to operation of the actuating means causing the initiation and termination of the aforesaid movements, whereby successive rotational increments thereof are precisely effected, a locater plunger is mounted in the base and includes a head for engagement with the positioning means when the plate has been rotated to its predetermined position, a latch to releasably engage said plunger means to maintain the same in position to move into such engagement, a latch arm connected to the latch to move the same and release the plunger means, and a striker member carried by the plate to engage the latch arm and thereby move the latch as stated.

2. The combination as claimed in claim 1, wherein the actuating means include a locater plunger to interengage with the positioning means of the table plate to terminate rotation of said plate and operate switch means to effect lowering of said plate, whereby the positioning means on the plate and base are brought into engagement to maintain the plate in rotated position.

3. The combination as claimed in claim 1, wherein, movement of said locater plunger causing a switch operator to move and thus operate the actuating means to thereby cause said plate to be lowered by the screw means as stated.

* * * * *